(12) United States Patent
Hildreth et al.

(10) Patent No.: US 11,673,289 B2
(45) Date of Patent: Jun. 13, 2023

(54) FABRICATING METAL OR CERAMIC COMPONENTS USING 3D PRINTING WITH DISSOLVABLE SUPPORTS OF A DIFFERENT MATERIAL

(71) Applicants: ARIZONA BOARD OF REGENTS ON BEHALF OF ARIZONA STATE UNIVERSITY, Scottsdale, AZ (US); THE PENN STATE RESEARCH FOUNDATION, University Park, PA (US)

(72) Inventors: Owen Hildreth, Tempe, AZ (US); Abdalla Nassar, State College, PA (US); Timothy W. Simpson, State College, PA (US)

(73) Assignees: ARIZONA BOARD OF REGENTS ON BEHALF OF ARIZONA STATE UNIVERSITY, Scottsdale, AZ (US); THE PENN STATE RESEARCH FOUNDATION, University Park, PA (US)

( * ) Notice: Subject to any disclaimer, the term of this patent is extended or adjusted under 35 U.S.C. 154(b) by 1277 days.

(21) Appl. No.: 15/998,839

(22) PCT Filed: Feb. 16, 2017

(86) PCT No.: PCT/US2017/018084
§ 371 (c)(1),
(2) Date: Aug. 16, 2018

(87) PCT Pub. No.: WO2017/143005
PCT Pub. Date: Aug. 24, 2017

(65) Prior Publication Data
US 2021/0138552 A1 May 13, 2021

Related U.S. Application Data

(60) Provisional application No. 62/295,912, filed on Feb. 16, 2016, provisional application No. 62/400,464, filed on Sep. 27, 2016.

(51) Int. Cl.
  *B28B 1/00* (2006.01)
  *B33Y 40/20* (2020.01)
  (Continued)

(52) U.S. Cl.
  CPC .............. *B28B 1/001* (2013.01); *B22F 10/25* (2021.01); *B22F 10/43* (2021.01); *B22F 10/62* (2021.01);
  (Continued)

(58) Field of Classification Search
  CPC ......... B28B 11/00; B28B 1/001; B33Y 40/20; B33Y 40/00; B33Y 70/00; B33Y 30/00;
  (Continued)

(56) References Cited

U.S. PATENT DOCUMENTS 3,011,920 A  12/1961  Shipley, Jr.
3,762,981 A  10/1973  Blank
(Continued)

FOREIGN PATENT DOCUMENTS

EP  0655317 A1  5/1995
EP  0697282 B1  2/1996
(Continued)

OTHER PUBLICATIONS

European Patent Office Extended Search Report for Application No. 17753793.3 dated Sep. 13, 2019 (8 pages).
(Continued)

*Primary Examiner* — Monica A Huson
*Assistant Examiner* — Kelsey C Grace
(74) *Attorney, Agent, or Firm* — Buchanan Ingersoll & Rooney PC (57) ABSTRACT

Methods and systems are described for fabricating a component using 3D printing. A 3D printed piece is created including a body of the component, a support structure, and a first sacrificial interface region coupling the body of the
(Continued)

component to the support structure. The body of the component is formed of a first metal or ceramic material and the first sacrificial interface region is formed at least partially of a second metal or ceramic material. The body of the component is then separated from the support structure by applying a chemical or electrochemical dissolution process to the 3D printed piece. Because the second metal or ceramic material is less resistant to the dissolution process than the first metal or ceramic material, the first sacrificial interface region at least partially dissolves, thereby separating the body of the metal component from the support structure, without dissolving the body of the component.

19 Claims, 8 Drawing Sheets

(51) Int. Cl.
  *B22F 10/62* (2021.01)
  *B22F 10/43* (2021.01)
  *B22F 10/25* (2021.01)
  *B33Y 10/00* (2015.01)
  *B33Y 70/00* (2020.01)
  *B22F 10/66* (2021.01)

(52) U.S. Cl.
  CPC .............. *B33Y 40/20* (2020.01); *B22F 10/66* (2021.01); *B22F 2301/052* (2013.01); *B22F 2301/15* (2013.01); *B22F 2301/205* (2013.01); *B22F 2302/105* (2013.01); *B22F 2302/256* (2013.01); *B33Y 10/00* (2014.12); *B33Y 70/00* (2014.12)

(58) Field of Classification Search
  CPC .......... B33Y 10/00; B22F 10/66; B22F 10/62; B22F 10/25; B22F 10/43; B22F 2301/205; B22F 2302/105; B22F 2302/256; B22F 2301/15; B22F 2999/00; B22F 2301/052; B22F 2003/244; C25F 3/02; C04B 35/565; C04B 2235/6026; C04B 2235/6028; Y02P 10/25
  See application file for complete search history.

(56) References Cited

U.S. PATENT DOCUMENTS

| | | | |
|---|---|---|---|
| 4,420,459 | A | 12/1983 | Mizuhara |
| 5,121,329 | A | 6/1992 | Crump |
| 5,268,088 | A | 12/1993 | Okabayashi |
| 5,342,501 | A | 8/1994 | Okabayashi |
| 5,464,707 | A | 11/1995 | Moulton et al. |
| 5,621,449 | A | 4/1997 | Leenders et al. |
| 6,165,406 | A | 12/2000 | Jang et al. |
| 7,319,528 | B2 | 1/2008 | Hidaka |
| 8,043,535 | B2 | 10/2011 | Kamikoriyama et al. |
| 8,470,231 | B1 | 6/2013 | Dikovsky et al. |
| 8,813,651 | B1 | 8/2014 | Hooke |
| 10,286,713 | B2 | 5/2019 | Hildreth et al. |
| 10,288,638 | B2 | 5/2019 | Hildreth et al. |
| 2003/0128249 | A1 | 7/2003 | Booth |
| 2003/0199162 | A1 | 10/2003 | Seki |
| 2003/0230549 | A1 | 12/2003 | Buchanan et al. |
| 2004/0005258 | A1* | 1/2004 | Fonash .................. D01F 9/21 422/600 |
| 2006/0130700 | A1 | 6/2006 | Reinartz |
| 2010/0021638 | A1 | 1/2010 | Varanka et al. |
| 2011/0035848 | A1 | 2/2011 | Perkins et al. |
| 2011/0036802 | A1 | 2/2011 | Ronsin et al. |
| 2011/0111138 | A1 | 5/2011 | McCullough et al. |
| 2011/0256416 | A1 | 10/2011 | Brancher et al. |
| 2012/0193841 | A1 | 8/2012 | Wang et al. |
| 2013/0075957 | A1 | 3/2013 | Swanson et al. |
| 2013/0126465 | A1 | 5/2013 | Hu et al. |
| 2014/0202595 | A1 | 7/2014 | Hofmann |
| 2014/0257549 | A1 | 9/2014 | Swartz et al. |
| 2015/0004325 | A1 | 1/2015 | Walker et al. |
| 2015/0035209 | A1 | 2/2015 | Shah et al. |
| 2015/0037597 | A1 | 2/2015 | Kim et al. |
| 2015/0056319 | A1 | 2/2015 | Din et al. |
| 2015/0197862 | A1 | 7/2015 | Engel |
| 2016/0107234 | A1 | 4/2016 | Craeghs et al. |
| 2016/0199201 | A1 | 7/2016 | Weiss et al. |
| 2017/0146560 | A1 | 5/2017 | Hildreth et al. |
| 2017/0197371 | A1* | 7/2017 | Fetfatsidis ............ B29C 70/543 |
| 2018/0099520 | A1 | 4/2018 | Hildreth et al. |
| 2019/0039137 | A1 | 2/2019 | Hildreth et al. |
| 2019/0314895 | A1 | 10/2019 | Hildreth et al. |
| 2021/0170493 | A1 | 6/2021 | Hildreth |

FOREIGN PATENT DOCUMENTS

| | | |
|---|---|---|
| KR | 100359103 B1 | 11/2002 |
| WO | 2012041522 A1 | 4/2012 |
| WO | 2012131481 A1 | 10/2012 |
| WO | 2012162805 A1 | 12/2012 |
| WO | 2014197790 A1 | 12/2014 |

OTHER PUBLICATIONS

International Preliminary Report on Patentability for Application No. PCT/US2018/033277 dated Nov. 28, 2019 (9 pages).
Aberle et al., "Series Resistance of Solar Cells," in Photovoltaic Specialist Conference, 1993., IEEE, 1993, pp. 133-139.
Ambrose et al., "Thermodynamic properties of organic oxygen compounds. Part IX. The critical properties and vapour pressures, above five atmospheres, of six aliphatic alcohols ," J.Chem.Soc., 3614-3625 (1963).
An et al., "High-Resolution Printing of 3D Structure Using an Electrohydrodynamic Inkjet with Multiple Functional Inks," Jun. 19, 2015, Adv. Mater. 2015, 27, 4322-4328, Wiley-VCH.
Bidoki et al., "Ink-Jet Fabrication of Electronic Components." J. Micromech. Microeng. 2007, 17, 967-974.
Chien et al., "Metallization optimization for high efficiency silicon heterojunction solar cells using low-temperature paste screen printing," 39th IEEE Photovoltaics Spec. Conf., 2013.
Cunningham et al., "Measurement of the correlation between the specular reflectance and surface roughness of Ag films," Phys. Rev. B, vol. 14, No. 2, pp. 479-483, Jul. 1976.
Dai et al., "Corrosion behavior of selective laser melted Ti—6Al—4V alloy in NaCl solution," Corrosion Science. 102 (2016) 484-489. doi:10.1016/j.corsci.2015.10.041.
De Minjer et al., "The Nucleation with SnCl[Sub 2]-PdCl[Sub 2] Solutions of Glass Before Electroless Plating." J Electrochem Soc 1973, 120, 1644.
De Wolf et al., "High-efficiency Silicon Heterojunction Solar Cells : A Review," vol. 2, pp. 7-24, 2012.
De Wolf et al., "Nature of doped a-Si:H/c-Siinterface recombination," J. Appl. Phys., vol. 105, 2009.
Deakin et al., "De-alloying of type 316 stainless steel in hot, concentrated sodium hydroxide solution," Corrosion Science. 46 (2004) 2117-2133. doi: 10.1016/j.corsci.2004.01.011.
Demaurex et al., "Damage at hydrogenated amorphous/crystalline silicon interfaces by indium tin oxide overlayer sputtering," Appl. Phys. Lett., vol. 101, No. 17, p. 171604, 2012.
Deng et al., "Copper carboxylate with different carbon chain lengths as metal-organic decomposition ink," J. Mater. Sci.: Mater. Electron. 25, 390-397 (2013).
Dillon et al., "Fundamental Equation for Calculation of the Thermodynamic Properties of Ethanol," International Journal of Thermophysics, vol. 25, No. 2, 2004, 32.
Domonoky, BonsiBrain, Support—Full Disclosure, Httpifeelbeta. Deindex.Phpsupportsupport-Full-Disclosure. (2010). http://ifeelbeta.de/index.php/support/support-full-disclosure (accessed Feb. 2, 2016).

(56) References Cited

OTHER PUBLICATIONS

Epstein et al., "Cathodic corrosion of stainless steel in nitric acid," Corrosion Science. 5 (1965) 461-470. doi: 10.1016/S0010-938X(65)80051-8.

Evans, "Behaviour of metals in nitric acid," T Faraday Soc. 40 (1944) 120-130. doi:10.1039/TF9444000120.

Farraj et al., "Self-Reduction of a Copper Complex MOD Ink for Inkjet Printing Conductive Patterns on Plastics." Chem Commun 2015, 51, 1587-1590.

Galwey et al., "Thermal decomposition of three crystalline modifications of anhydrous copper(II) formate," J. Phys. Chem., 78, 2664-2670 (1974).

Griffith et al., "Multi-material processing by LENS," Solid Freeform Fabrication Proceedings. (1997) 387-394. doi:10.1.1.476.3973.

GSI Chemical Database http://gsi-net.com/en/publications/gsi-chemical-database/single/276.html (accessed Apr. 10, 2016).

Hannebauer et al., "18.9%-efficient screen-printed solar cells applying a print-on-print process," in Proc. 16th European Photovoltaic Solar Energy Conf, 2011, pp. 5-9.

Hermans et al., "Advanced Metallization Concepts by Inkjet Printing," in 29th European Photovoltaic Solar Energy Conference and Exhibition, 2014, pp. 518-522.

Hildreth et al., "Dissolvable Metal Supports for 3D Direct Metal Printing," 3D Printing and Additive Manufacturing. 3 (2016) 90-97. doi:10.1089/3dp.2016.0013.

Hock, "Inkjet Printing Gone Solar," R & D Magazine, Aug. 2015.

International Preliminary Report on Patentability for Application No. PCT/US2017/018084 dated Aug. 30, 2018 (9 pages).

International Preliminary Report on Patentability for Application No. PCT/US2017/018096 dated Aug. 30, 2018 (6 pages).

International Preliminary Report on Patentability for Application No. PCT/US2017/018104 dated Jan. 24, 2019 (9 pages).

International Search Report and Written Opinion for Application No. PCT/US2017/018084 dated Jun. 1, 2017, 10 pages.

International Search Report and Written Opinion for Application No. PCT/US2017/018096 dated May 15, 2017, 7 pages.

International Search Report and Written Opinion for Application No. PCT/US2017/018104 dated Jun. 1, 2017, 10 pages.

International Search Report and WrittenOpinion for Application No. PCT/US2018/33277 dated Aug. 8, 2018, 13 pages.

Jahn et al., "Inkjet printing of conductive silver patterns by using the first aqueous particle-free MOD ink without additional stabilizing ligands," Chem. Mater. 22, 3067-3071 (2010).

Jeffries et al., "Reactive silver ink as front contacts for high efficiency silicon heterojunction solar cells," 2016 IEEE 43rd Photovoltaic Specialists Conference (PVSC).

Johannes et al., "Letting Corrosion Work for You: Novel Pathways to Additive Manufacturing and Nanomaterial Synthesis Using Electrochemically-Driven Powder Consolidation," Advanced Engineering Materials. 16 (2014) 1147-1159. doi:10.1002/adem.201300562.

Kauffman et al., "Prediction of Surface Tension, Viscosity, and Thermal Conductivity for Common Organic Solvents Using Quantitative Structure-Property Relationships," J. Chem. Inf. Comput. Sci. 41, 408-418 (2001).

Kikuchi et al., "Measurement of the adhesion of silver films to glass substrates," Thin Solid Films 124, 343-349 (1985).

Kim et al., "Investigation of the sensitization and intergranular corrosion of tube-to-tubesheet welds of hyper duplex stainless steel using an electrochemical reactivation method," Corrosion Science. 87 (2014) 60-70. doi:10.1016/j.corsci.2014.06.005.

Kim et al., "Nonlinear optical transitions of GaAs/AlGaAs GaAs/AlGaAs asymmetric double-well structures," Applied Physics Letters, 89, 1-3 (2006).

King et al., "Ultrasound Atomic Force Microscopy: Atomic-Scale Stability and Registration in Ambient Conditions," Nano Letters, Jan. 27, 2009, vol. 9, No. 4, 1451-1456, American Chemical Society 2009.

Kolman et al., "Corrosion of 304 stainless steel exposed to nitric acid-chloride environments," Corrosion Science. 39 (1997) 2067-2093. doi:10.1016/S0010-938X(97)00092-9.

Laleh et al., "Suppression of chromium depletion and sensitization in austenitic stainless steel by surface mechanical attrition treatment," Mater Lett. 65 (2011) 1935-1937 doi:10.1016/j.matlet.2011.03.055.

Lee et al., "A Novel Solution—Stamping Process for Preparation of a Highly Conductive Aluminum Thin Film." Adv. Mater. 2011, 23, 5524-5528.

Lee et al., "Long-Term Sustainable Aluminum Precursor Solution for Highly Conductive Thin Films on Rigid and Flexible Substrates." ACS Appl. Mater. Interfaces 2014, 6, 15480-15487.

Lee et al., "Solution processed aluminum paper for flexible electronics," Langmuir 28, 13127-13135 (2012).

Lefky et al., "Dissolvable Supports in Powder Bed Fusion-Printed Stainless Steel," 3D Printing and Additive Manufacturing, vol. 4, No. 1, 2017.

Lefky et al., "Impact of Solvent Selection and Temperature on Porosity and Resistance of Printed Self-Reducing Silver Inks.," Phys. Status Solidi Appl. Mater. Sci., 2016, 1-8.

Li et al., "Conductive copper and nickel lines via reactive inkjet printing," J. Mater. Chem., vol. 19, No. 22, p. 3719, 2009.

Marinkovic, "Contact resistance effects in thin film solar cells and thin film transistors," Jacobs University Thesis, 2013.

McLachlan et al., "Electrical Resistivity of Composites," J. Am. Ceram. Soc., vol. 73, No. 8, pp. 2187-2203, Aug. 1990.

European Patent Office Extended Search Report for Application No. 17828087.1 dated Feb. 10, 2020 (8 pages).

European Patent Office Examination Report for Application No. 17753793.3 dated May 28, 2020 (7 pages).

MEGlobal Ethylene Glycol Product Guide http://www.meglobal.biz/media/product_guides/MEGlobal_MEG.pdf (accessed Apr. 10, 2016).

Meier et al., "Contact resistance: Its measurement and relative importance to power loss in a solar cell," IEEE Trans. Electron Devices, vol. 31, No. 5, pp. 647-653, May 1984.

Meier et al., "Inkjetprinted, conductive, 25 uμm wide silver tracks on unstructured polyimide," Phys. Status Solidi Appl. Mater. Sci., vol. 206, No. 7, pp. 1626-1630, 2009.

Mo et al., "Effects of Dodecylamine and Dodecanethiol on the Conductive Properties of Nano-Ag Films." Appl Surf Sci 2011, 257, 5746-5753.

N. R. E. L. NREL, "Best Research-Cell Efficiencies," 2015.

Nie et al., "Inkjet printing of silver citrate conductive ink on PET substrate," Appl. Surf. Sci. 261, 554-560 (2012).

Ningshen et al., "Corrosion behaviour of AISI type 304L stainless steel in nitric acid media containing oxidizing species," Corrosion Science. 53 (2011) 64-70. doi:10.1016/j.corsci.2010.09.023.

Noor et al., "Corrosion Behavios of Mild Steel in Hydrochloric Acid Solutions," Int J Electrochem Sci 2008, 3, 806.

Perelaer et al., "Printed electronics: the challenges involved in printing devices, interconnects, and contacts based on inorganic materials," J. Mater. Chem., vol. 20, No. 39, p. 8446, 2010.

Pysch et al., "A review and comparison of different methods to determine the series resistance of solar cells," Sol. Energy Mater. Sol. Cells, vol. 91, No. 18, pp. 1698-1706, 2007.

Rasigni et al., "Roughness spectrum and surface plasmons for surfaces of silver, copper, gold, and magnesium deposits," Phys. Rev. B, vol. 27, No. 2, pp. 819-830, Jan. 1983.

Rosen et al., "Printing a Self-Reducing Copper Precursor on 2D and 3D Objects to Yield Copper Patterns with 50% Copper's Bulk Conductivity," Adv. Mater. 2, 1440448 (2015).

Sastry et al., "Anodic Protection of Mild Steel in Nitric Acid," Corrosion. 39 (1983) 55-60. doi:10.5006/1.3580815.

Seikh et al., "Corrosion Behavior in 3.5% NaCl Solutions of γ-TiAl Processed by Electron Beam Melting Process," Metals 2015, vol. 5, pp. 2289-2302. 5 (2015) 2289-2302. doi:10.3390/met5042289.

Semi, "International Technology Roadmap for Photovoltaic 2015 Results," ITRPV, 2015.

Shanmugam et al., "Analysis of Fine-Line Screen and Stencil-Printed Metal Contacts for Silicon Wafer Solar Cells," IEEE J. Photovoltaics, vol. 5, No. 2, pp. 525-533, 2015.

Shapovalov, "Porous Metals.," MRS Bull., vol. 19, No. 04, pp. 24-28, Apr. 1994.

(56) References Cited

OTHER PUBLICATIONS

Shin et al., "A Self-Reducible and Alcohol-Soluble Copper-Based Metal-Organic Decomposition Ink for Printed Electronics," ACS Appl. Mater. Interfaces 6, 3312-3319 (2014).
Sinton et al., "A quasi-steady-state open-circuit voltage method for solar cell characterization," Proc. 16th Eur. Photovolt. Sol. Energy Conf, No. May, pp. 1-4, 2000.
Starr et al., "Controlling Phase Composition in Selective Laser Melted Stainless Steels," Power (W) 2012, 439.
Streicher et al., "Pitting Corrosion of 18Cr-8Ni Stainless Steel," J. Electrochem. Soc. 1956, 103, 375-390.
Stull, Vapor Pressure of Pure Substances. Organic and Inorganic Compounds. Ind. Eng. Chem. 1947, 39, 517-540.
Taguchi et al., "Obtaining a higherVoc in HIT cells," Prog. Photovoltaics Res. Appl., vol. 13, No. 6, pp. 481-488, Sep. 2005.
Talbot et al., "Control of the Particle Distribution in Inkjet Printing through an Evaporation-Driven Sol-Gel Transition," ACS Appl. Mater. Interf. 6, 9572-9583 (2014).
Talbot et al., "Evaporation of Picoliter Droplets on Surfaces with a Range of Wettabilities and Thermal Conductivities," Physical Review E, 2012, 85, 061604.
Tao et al., "A facile approach to a silver conductive ink with high performance for macroelectronics," Nanoscale Res. Lett., vol. 8, No. 1, pp. 1-6, 2013.
The Silver, Glistening Particles of Industrial Silver, https://www.Silverinstitute.orgsitewpcontentuploadsGPISDec.pdf (accessed Dec. 20, 2016).
Turpin et al., "Carbon diffusion and phase transformations during gas carburizing of high-alloyed stainless steels: Experimental study and theoretical modeling," Metall and Mat Trans A. 36 (2005) 2751-2760. doi:10.1007/s11661-005-0271-4.
Valeton et al., "Room temperature preparation of conductive silver features using spin-coating and inkjet printing ," J. Mater. Chem. 20, 543-546 (2010).
Vanýsek, "Impact of electrode geometry, depth of immersion, and size on impedance measurements," Canadian Journal of Chemistry, 1997, 75, 1635-1642.
Walker et al., "Reactive silver inks for patterning high-conductivity features at mild temperatures," J. Am. Chem. Soc., vol. 134, No. 3, pp. 1419-1421, 2012.
Wang et al., "Research on the fabricating quality optimization of the overhanging surface in SLM process," Int J Adv Manuf Technol. 65 (2013) 1471-1484. doi:10.1007/s00170-012-4271-4.
Wilke et al., Estimation of Diffusion Coefficients for Gases and Vapors. Ind. Eng. Chem. 1955, 47, 1253-1257.
Wolf et al., "Series resistance effects on solar cell measurements," Adv. Energy Convers., vol. 3, No. 2, pp. 455-479, 1963.
Zhang et al., "Reference and counter electrode positions affect electrochemical characterization of bioanodes in different bioelectrochemical systems," Biotechnology and Bioengineering 2014, 111(10): 1931-1939.
Disclosed Anonymously., "Dissolvable Metal-Polymer Composite Parts" [online], IP.com Prior Art Database Technical Disclosure, Apr. 2015 [obtained on Sep. 26, 2019 from ip.com], retrieved from the internet: <URL:file:///C:/Users/olarson/Downloads/IPCOM000241271D.pdf>.
Dinwiddie, R. et al., "Real-time process monitoring and temperature mapping of a 3D polymer printing process", SPIE Defense, Security, and Sensing (Baltimore, MD, May 22, 2013), 2013, vol. 8705, article 87050L, 10 pages <DOI:10.1117/12.1518454>.
Zenou, M. et al., "Printing of metallic 3D micro-objects by laser induced forward transfer", Optics Express, Jan. 2016, vol. 24, No. 2, pp. 1431-1446 <DOI:10.1364/OE.24.001431>.
Jones et al., Physical Properties of Ethylene Glycol—Google Scholar; Glycols. G. 0. Curme, 1952.
Topsoe, Semiconductor Division, Geometric Factors in Four Point Resistivity Measurement, 2nd edn. (1968). Available from download at Bridge Technology's web site, http://www.four-point-probes.com/haldor.html.
Roll, Daryl L., Passivation and the Passive Layer, Astro Pak, Jul. 2014 (Year: 2014).

* cited by examiner

FABRICATING METAL OR CERAMIC COMPONENTS USING 3D PRINTING WITH DISSOLVABLE SUPPORTS OF A DIFFERENT MATERIAL

RELATED APPLICATIONS

This application claims the benefit of U.S. Provisional Application No. 62/295,912, filed Feb. 16, 2016, entitled "DISSOLVABLE METAL SUPPORTS IN 3D PRINTED METALS AND OXIDES," and U.S. Provisional Application No. 62/400,464, filed Sep. 27, 2016, entitled "DIRECT SUPPORT DISSOLUTION FOR 3D PRINTED METALS AND OXIDES," the entire contents of both of which are incorporated herein by reference.

BACKGROUND

The present invention relates to techniques for fabricating components using 3D printed metals and oxides.

Additive Manufacturing (AM) (e.g., 3D printing) of metal components can be classified by their binding method (sintering, melting, polymer adhesive), energy delivery method (laser, electron beam), and metal feed method (powder-bed, powder-fed, wire-fed). Metal components are often built using one of two methods; powder-bed fusion or directed-energy deposition. In powder-bed fusion, a laser or electron beam is scanned over a bed of metal powder to locally sinter or melt the powder, forming a slice of a part; building up multiple slices by adding another layer of metal powder to the "bed" produces a 3D metal object. In Directed-Energy Deposition (DED), metal powder(s) are blown or a wire is fed into a melt pool formed by a laser or electron beam. This added material increases the melt-pool and parts are built up in a layer-by-layer manner by moving the stage and energy/material deposition head relative to one another.

Both powder-bed and DED printing have advantages and disadvantages. Powder-bed systems can print complex parts with overhanging geometry with minimal post-print machining operations required. However, powder-bed systems are generally limited to printing a single material at a time. In contrast, the powder-fed DED printers can print pieces including multiple different materials, but parts with significant overhangs require extensive post-print machining operations to remove supports.

When the supports needed for many 3D metal printing processes must be machined off, this adds considerable expense (sometimes higher than the cost of the original part) such that it often pushes the cost of 3D printing higher than that of a traditional "subtractive" manufacturing process. Additionally, these supports inherently limit the size and complexity of the parts that can be fabricated using "monolithic" or single material printing. For example, in order to using 3D printing techniques for fabricate a frame for a car, the resulting frame would be designed in a way that is large, heavy, and geometrically awkward—making it extremely difficult to machine into final size and tolerance. The cost of a milling machine that size would be extremely high and manipulating the part into the machine with the necessary precision would be difficult and would likely require specialized tooling just for that part.

SUMMARY 3D printing of metals will have a significant impact on manufacturing around the world and have projected growth in the billions of dollars over the next few years. The systems and methods described herein dramatically simplify post-processing techniques for 3D metal printing without sacrificing part integrity. Additionally, these processing techniques open up new avenues for part geometries by eliminating the requirement that supports be accessible to machining operations.

Various embodiments described in this disclosure provide a set of methods and chemistries for easy removal of supports or sections of a 3D printed structure by incorporating chemically or electrochemically dissolvable elements into the 3D printed structure. This new process dramatically simplifies the support removal process for materials such as metals, oxides, and ceramics, while also opening up new design freedoms by removing the restriction that support structures must be machine accessible—using the methods and systems described herein, the support structures must be merely fluid accessible.

Different metal and ceramic materials will have different chemical stability levels to various etchants (for chemical dissolution) and different redox potentials (for electrochemical etching). By incorporating small sections of a "dissolvable" metal or ceramic material into a support structure, the resulting support structure can be chemically or electrochemically dissolved and/or separated from the body of the component being manufactured with little or no damage to the component. For example, a dissolvable support material of Ni could be used while manufacturing a Ti part; Ni's lower redox (or standard) potential relative to Ti (Ti=+0.7 V, Ni=−0.26 V SHE) means that the Ni sections will oxidize and dissolve many orders of magnitude faster than the Ti part when coupled with an anode in an electrochemical etching bath set at a potential between Ti and Ni (e.g. ~0.1 V SHE). Under these types of conditions, the Ni will preferentially dissolve while the Ti will be left untouched.

This technique covers a broad range of metal and ceramic materials as both the "part" material and the "sacrificial" support material. In some embodiments, the sacrificial material is chosen that is less chemically or electrochemically stable than the part material. Additionally, the electrolyte and complexing agents may be adjusted to control the solubility of the dissolved sacrificial material. Additives may be added that improve passivation of the part material or selectively remove passivation on the sacrificial material. Multiple sacrificial materials may be used together to enable sequential removal techniques, where one set of supports or sacrificial materials are dissolved at a time. For example, this could be used to remove supports internal to the structure while leaving other supports for metrology, machining, fixturing, etc.

In one embodiment, the invention provides a dissolvable or sacrificial material incorporated into a 3D printed metallic part during printing. In some such embodiments, the dissolvable or sacrificial material is less chemically stable in an etchant solution than the part material. In other embodiments, the dissolvable or sacrificial material is less electrochemically stable in an electrochemical bath than the part material.

In another embodiment, the invention provides a method of fabricating a component. A 3D printed piece is created using a 3D printer. The 3D printed piece includes a body of the component, a support structure, and a first sacrificial interface region coupling the body of the component to the support structure. The body of the component is formed of a first metal or ceramic material and the first sacrificial interface region is formed at least partially of a second metal or ceramic material. The body of the component is then separated from the support structure by applying a chemical or electrochemical dissolution process to the 3D printed piece. Because the second metal or ceramic material is less resistant to the chemical or electrochemical dissolution process than the first metal or ceramic material, the first sacrificial interface region at least partially dissolves, thereby separating the body of the metal component from the support structure without dissolving the body of the component.

In some embodiments, additives, chelating agents, complexing agents, accelerating agents, and/or inhibiting agents are added to the chemical bath to promote dissolution of the dissolvable or sacrificial material or to increase the solubility of the dissolved/etched sacrificial material. In some embodiments, etchant solutions are used that will selectively etch the dissolvable/sacrificial material with acceptably low etch rates for the part material.

In some embodiments, the sequence of dissolvable metallic material removal is adjusted by using different dissolvable metallic materials with varying degrees of stability during chemical or electrochemical etching. Section can be selectively or sequenced by varying chemical or electrochemical stability (redox potential) of by varying support length or geometry (e.g., by adjusting the cross-section of the dissolvable support).

In some embodiments, the dissolvable material may be incorporated into the primary part across a gradient to impart beneficial material properties (strength, coefficient of thermal expansion, modulus, chemical purity, chemical resistance, and more). In other embodiments, the dissolvable material is incorporated into the primary part as an aggregate to leave behind a porous structure after removal or as a section of part material to leave behind a small section of the primary part material for chemical, mechanical, or alloying purposes.

In some embodiments, the distance between the part and the dissolvable section are adjusted to minimize diffusion of the dissolvable metal into the primary part and/or to minimize the amount of support material that must be removed in post-processing In some embodiments, a mix of sequence of chemical and/or electrochemical dissolution pathways are designed and used to control the processing of the part. In some such embodiments, the electrochemical process or the chemical etching/dissolution process is self-limiting or stopping.

In some embodiments, additives are added to the etchant/electrolyte to passivate or protect the part material or other sections or to make the dissolvable sections more susceptible to chemical or electrochemical dissolution.

In some embodiments, the etchant is delivered in liquid form. In other embodiments, the etchant is deliver in vapor form such as, for example, an HF vapor etchant with $SiO_2$ support material. In still other embodiments, the etchant is delivered in solid form such as, for example, Ga etchant with aluminum support material.

In some embodiments, interface materials are added between the dissolvable support and the part material to promote adhesion, mechanical compliance, or other properties necessary for processing. In some such embodiments, a Ti layer is added between $SiO_2$ dissolvable support and an Al part as Ti provides a good adhesion promoter for both Al and $SiO_2$ and will be dissolved by $HF_{liquid}$ or $HF_{vapor}$ to form $TiF_4$.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
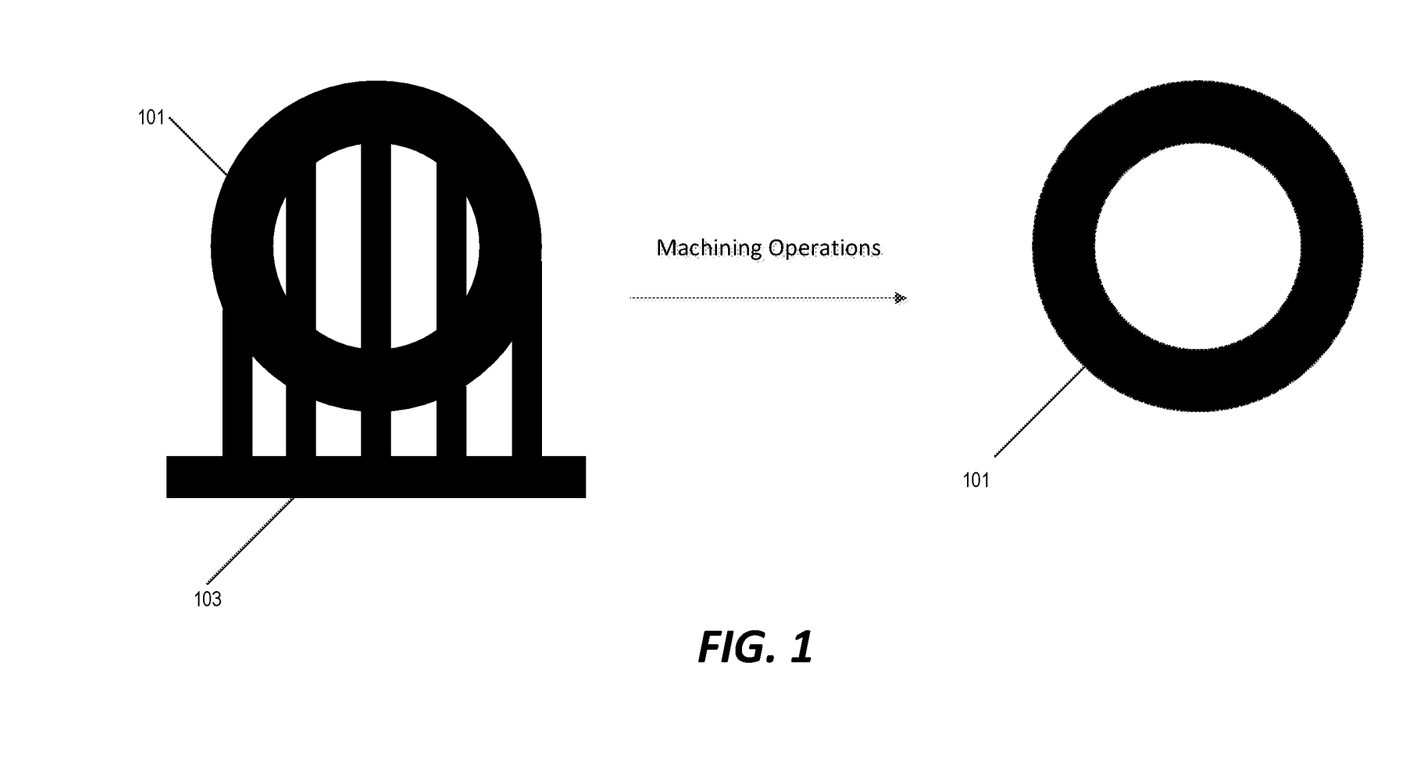
FIG. 1 is a schematic diagram of a method of fabricating a part using machining techniques.

FIG. 1 illustrates an example of a method of manufacturing a circular component 101 using 3D printing techniques. In this example, a 3D printed piece is created including the component 101 and a support structure 103 "printed" from the same materials (e.g., stainless steel or titanium). After the component 101 and the support 103 are created using monolithic support strategies, complicated and intricate machining operations are needed to remove the supports 103 from the component 101. These machining operations add cost and impose design restrictions on the part. Machine shops typically charge between $30-$100 per hour for machine time and the monolithic structure must be designed such that the support structures 103 are accessible to the tool. This accessibility requirement limits the types of shapes that can be fabricated and/or may require additional features on the part/support so that the part can be held while supports are being machined. Overall, this process is costly and adds unwanted complexity to the design, fabrication, and post-processing steps. Furthermore, some machining techniques cannot be effectively used when manufacturing components from some types of metal or ceramic materials (for example, silicon carbide).

Figure 2:
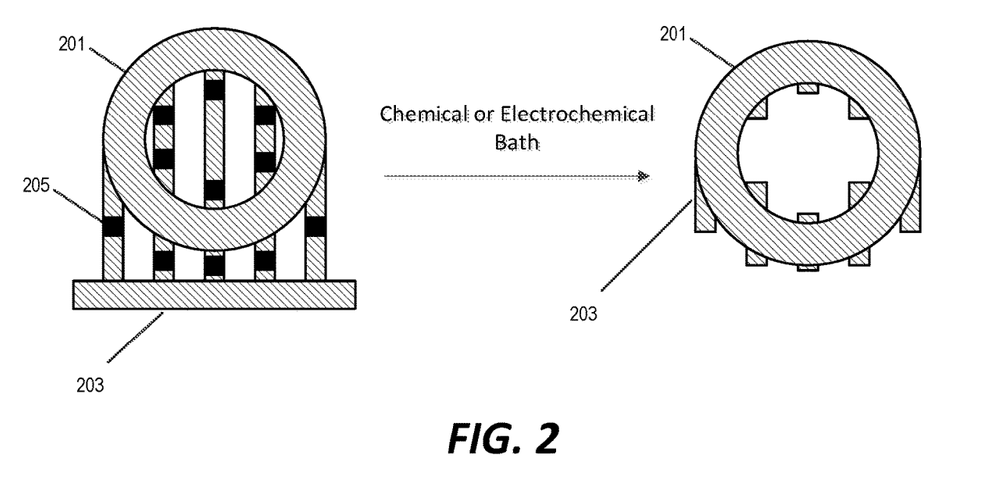
FIG. 2 is a schematic diagram of a method of fabricating a component using dissolvable sacrificial interface regions offset from the component.
Figure 3:
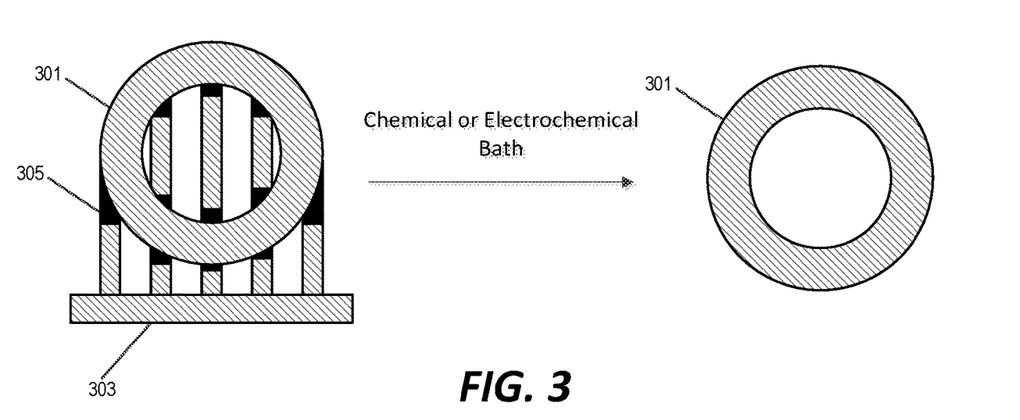
FIG. 3 is a schematic diagram of a method of fabricating a component using dissolvable sacrificial interface regions at the interface between the component and a support structure.
Figure 4:
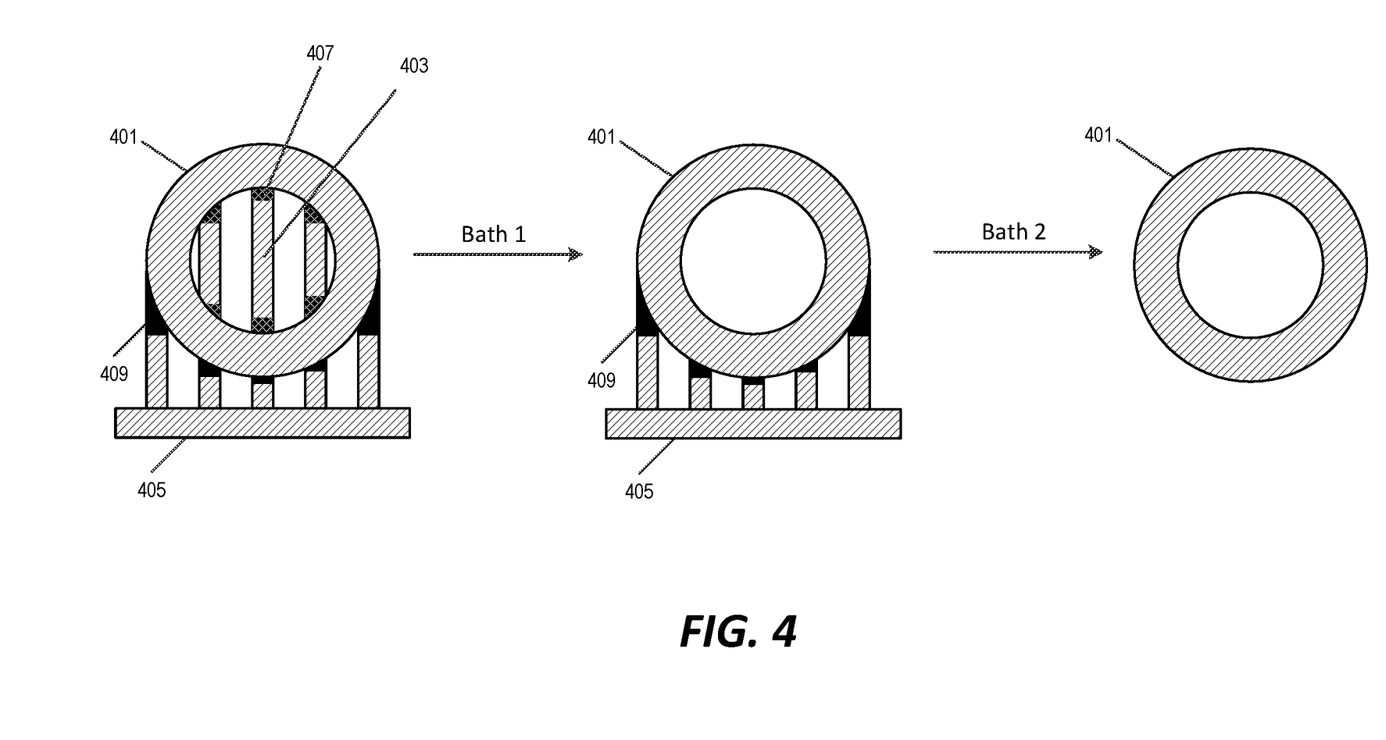
FIG. 4 is a schematic diagram of a method of fabricating a component using sacrificial interface regions formed of multiple different dissolvable materials to control the sequencing by which the component is separated from the support structure.

FIGS. 2-4 illustrate methods for fabricating a metal of ceramic by incorporating dissolvable (either chemically or electrochemically) elements into the structure of the 3D printed piece. This new process dramatically simplifies the support removable process for metals while also opening up new design freedoms by removing the restriction that the resulting support structures must be machine accessible—in the examples of FIGS. 2-4, the support structure only need to be fluid accessible.

FIG. 2 illustrates a first example in which a 3D printed piece is created including a circular component 201, a support structure 203, and a series of dissolvable sacrificial interface regions 205 formed at locations coupling the component 201 to the support structure 203. In this example, during the 3D printing process, the component 201 and the support structure 203 are both formed of the same material (e.g., stainless steel, titanium, silicon carbide, etc.) and the sacrificial interface regions 205 are formed of a different material such as, for example, iron (Fe) or copper (Cu). In particular, the sacrificial interface regions 205 are formed of a metal or ceramic material that has a lower chemical or electrochemical stability compared to the material of the component 201 and that will dissolve in a chemical (or electrochemical) bath at a higher rate than the metal or ceramic material of the component 201.

For example, a 3D printed piece (such as the one illustrated in FIG. 2) may be created using nickel (Ni) for the sacrificial interface regions 205 and titanium (Ti) for the component 201. Ni's lower redox (or standard) potential relative to Ti (Ti=+0.7 V, Ni=−0.26 V SHE) means that the Ni sections will oxidize and dissolve many orders of magnitude faster than the Ti component 201 when coupled as an anode in an electrochemical etching bath set at a potential between Ti and Ni (e.g. ~0.1 V SHE). Under these conditions, the Ni will dissolve before the Ti is significantly affected by the etching bath process—thereby separating the Ti component 201 from the support structure 203.

In another example, the 3D printed piece (such as the one illustrated in FIG. 2) may be created using silicon oxide for the sacrificial interface regions 205 and silicon carbide for the component 201. Because silicon carbide is particularly difficult to alter by machining, the process illustrated in FIG. 2 (and further illustrated in other examples below) allows silicon carbide components to be manufactured with significantly improved precision.

In the example of FIG. 2, the sacrificial interface regions 205 are offset from the body of the component 201 to preserve the material purity of the component 201. Once dissolved, the part may need additional machining or polishing operations to achieve tolerances or surface finishes, but generally not for support removal. FIG. 3 illustrates an alternative example where the sacrificial interface regions 305 are created at the interface with the body of the component 301 by printing the dissolvable materials up to or almost up to the body of the component 301. This eliminates, reduces, or minimizes the need for post-processing after the body of the component 301 is separated from the support structure 303.

Although the examples above mention specific types of materials for the support structure 203/303, the component 201/301, and the sacrificial interface region 205/305, a broad range of metal, oxide, and ceramic materials can be used as either the "part" material or the "sacrificial" material. In general, a sacrificial material will be chosen that is less chemically or electrochemically stable than the part material. Additionally, electrolyte and complexing agents may be adjusted to control the solubility of the dissolved sacrificial material. Additives may be added that improve passivation of the component material or selectively remove passivation on the sacrificial material. Furthermore, multiple different sacrificial materials may be used to form different sacrificial interface regions to enable sequential removal techniques where one set of supports or sacrificial materials are dissolved at a time. For example, this could be used to remove supports internal to the structure while leaving other supports for metrology, machining, or other utilities until subsequent etching baths remove those supports.

FIG. 4 illustrates a two-step process in which multiple different dissolvable materials are used to make dissolution a controllable, sequential process where, first, less stable dissolvable supports are removed and then subsequent sections are dissolved in later steps. In particular, the 3D printed structure includes a component 401, a first set of support structures 403 inside the metal part 401, and a second set of support structures 405 below the body of the component 401. In this example, the body of the component 401 and both sets of support structures 403, 405 are made of the same material (e.g., stainless steel, titanium, silicon carbide, etc.). A first sacrificial interface region 407 between the body of the component 401 and the first set of support structures 403 is formed of a first material (e.g., copper) and a second sacrificial interface region 409 between the body of the component 401 and the second set of support structures 405 is formed of a second material (e.g., iron). A first chemical or electrochemical bath dissolves the first material (e.g., the copper) at the first sacrificial interface region 407 and thereby separates the first set of support structures 403 from the body of the component 401. However, the second set of support structures 405 still remains coupled to the body of the component 401 after the first bath treatment. A second bath (e.g., a machine metrology bath) subsequently dissolves the second material at the second sacrificial interface region 409 and frees the body of the component 401 from the second set of support structures 405.

Although the example of FIG. 4 discusses the multistep separation using two different dissolvable materials, in other implementations, this technique can be accomplished by changing the cross-section of the supports so that smaller dissolvable sections dissolve/etch away faster than larger supports—leaving sections behind for some mechanical or structural advantage. FIGS. 5-8 illustrate some examples of techniques for depositing the dissolvable material to more directly control how the metal part is shaped and/or separated from the support structure.

Figure 5:
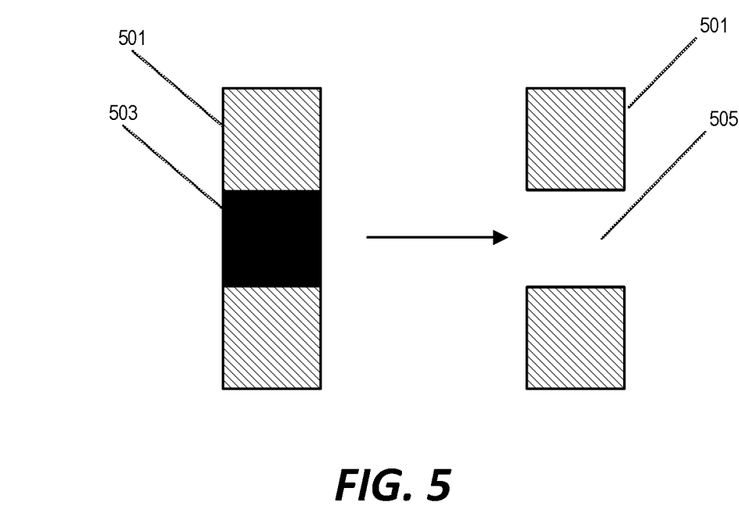
FIG. 5 is a schematic diagram of a method for separating a fabricated component from a support structure using a uniformly dissolvable sacrificial interface region.
Figure 6:
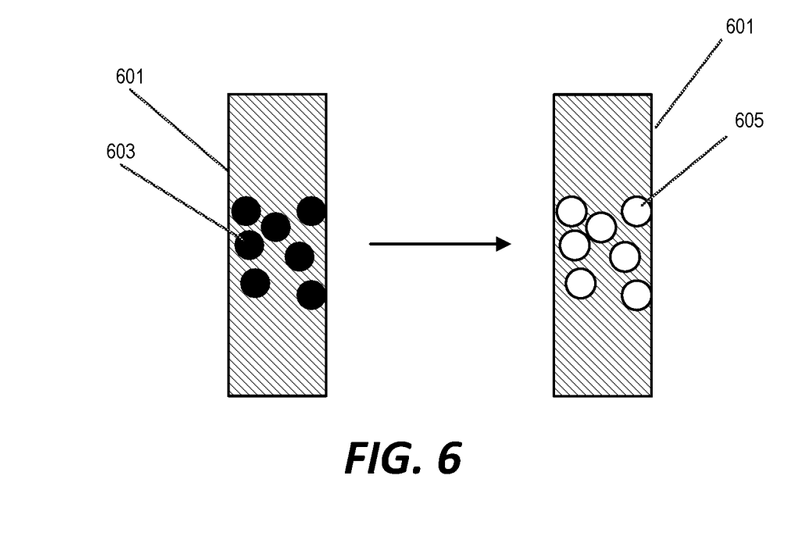
FIG. 6 is a schematic diagram of a method for separating a fabricated component from a support structure using a dispersive dissolvable sacrificial interface region.
Figure 7:
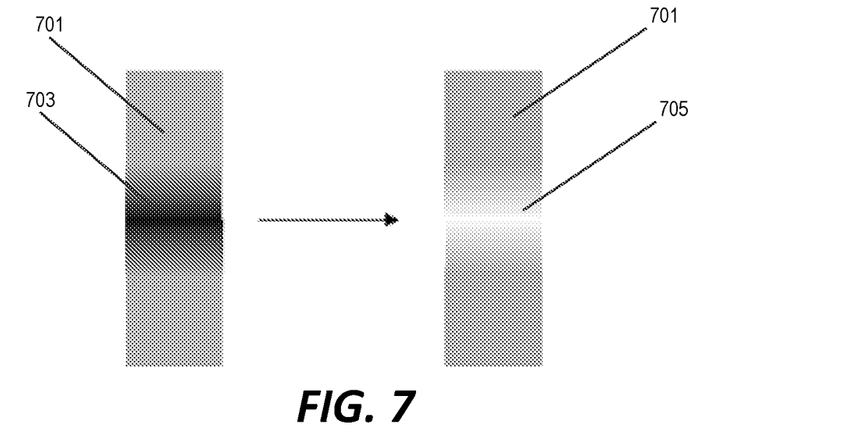
FIG. 7 is a schematic diagram of a method for separating a fabricated component from a support structure using a gradient dissolvable sacrificial interface region.
Figure 8:
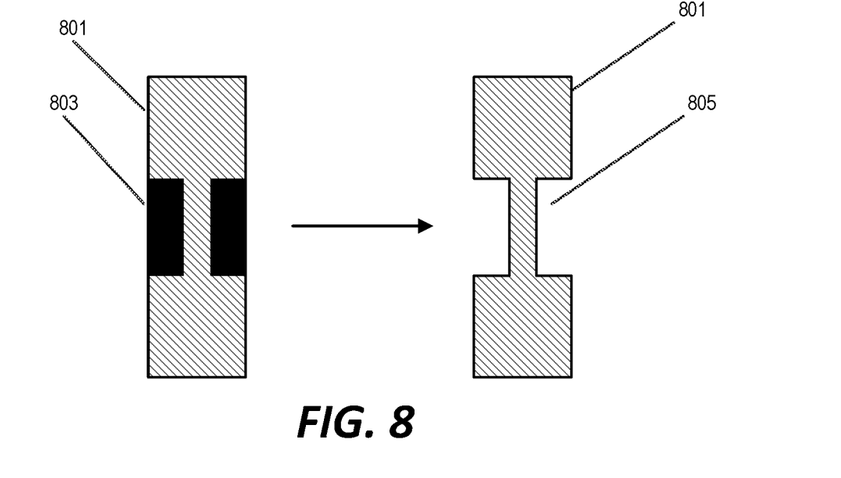
FIG. 8 is a schematic diagram of a method for separating a fabricated component from a support structure using a partially-dissolvable, partially-remnant sacrificial interface region.

In the example of FIG. 5, the dissolvable material 503 is uniformly deposited between the component material 501 such that, when the dissolvable material 503 is removed, the component 501 is completely separated from the support structure (e.g., space 505). FIG. 6 illustrates an example in which the dissolvable material 603 is dispersively deposited within the component material 601 such that sections of the support are dissolvable leaving a weakened coupling 605 between the body of the component and the support structure. In various implementations, this weakened coupling 605 could be further dissolved by additional processing or separated by machining. FIG. 7 illustrates an example that utilizes gradient deposition of the dissolvable material 703 within the component material 701 causing a similarly gradient separation 705 and prevents the support material from diffusing into the body of the component 701. Finally, in the example of FIG. 8, the dissolvable support material 803 forms only a partial cross-section of the component material 801. Dissolving this support material 803 only crosses partly through the component material (e.g., space 805). The remaining piece can be removed mechanically or chemically. Alternatively, this partial/remnant support technique can be utilized to fabricate small features of the metal part 801.

Although the examples presented above generally discuss using only two different materials at each sacrificial interface region (i.e., the "dissolvable" sacrificial material and the primary material used to form the component), in other implementations, multiple different types of material can be used at the same sacrificial interface region to better control (e.g., accelerate) the separation process or as an adhesion promoter between two different types of materials.

Figure 9:
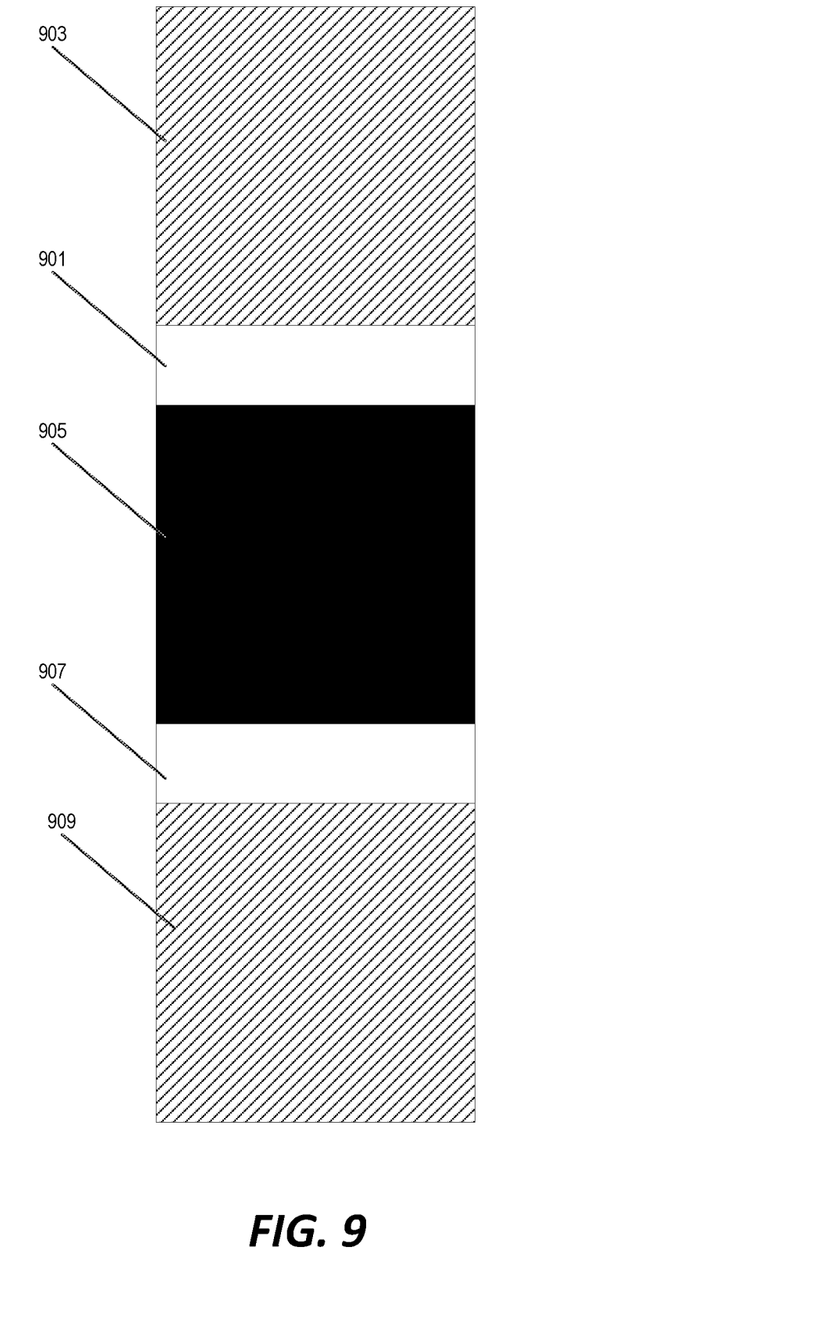
FIG. 9 is a schematic diagram of a 3D printed piece that includes an interface material between the body of the component and the sacrificial interface region.

FIG. 9 illustrates one example of a portion of a 3D printed piece in which a first interface layer 901 is printed between the body of the component 903 and the sacrificial interface region 905 and a second interface layer 907 is printed between the sacrificial interface region 905 and a support structure 909 of the 3D printed piece. This printing format might be utilized, for example, in an implementation where silicon dioxide ($SiO_2$) is used as the sacrificial material and the body of the component & the support structures are formed of a metal. In this example, interface layers 901, 907 formed of titanium (Ti) or chromium (Cr) may be used as an adhesion promoter to improve the bonding adhesion between the silicon dioxide and the metal of the component.

As discussed above, in various different implementations, a 3D printed piece is printed using multiple different materials with additional sacrificial materials incorporated at select areas to serve as sacrificial interface regions between the body of the component and the support structures. These additional sacrificial materials are selected to be less chemically or electrochemically stable compared to the primary material of the component being fabricated. Once the 3D printed piece is printed, the piece is placed in a chemical or electrochemical bath designed to selectively remove the sacrificial material. In one example, a Ti part with Ni dissolvable sections is printed and then immersed in sulfuric acid electrolyte (sulfuric acid, nickel sulfate, etc.) with a voltage of 0.1 V SHE applied between the 3D printed piece (functioning as the anode) and a cathode. Since the standard redox potential of Ni is ~−0.26 V SHE, the Ni will be oxidized to form soluble $Ni[H_2O]_6^{+2}$ $SO_4^{-2}$ by:

Example Anode Reactions:

$Ni_{metal} \rightarrow Ni^+_{(aq)} + 2e^-$ $E^0_{Ni/Ni+}$=0.26 V vs. SHE

Example Cathode Reactions $2H^+ + 2e^- \rightarrow H_{2(gas)}$ $E^0_{H+/H}$=0.0 V vs. SHE $Ni^+_{(aq)} + 2e \rightarrow Ni_{metal}$ $E^0_{Ni+/Ni}$=−0.26 V vs. SHE Since the standard redox potential of Ti is 0.7 V SHE, the Ti component would not be oxidized or dissolved by the electrolyte while the Ni dissolvable supports would be. Adding additional alloys with different standard redox potential could be incorporated to enable selective and sequential dissolution of the dissolvable supports. For example (similar to the example of FIG. 4) separate sacrificial interface regions formed of Cu and Ni alloys could be used. Since the redox potential of Cu is higher than Ni but lower than Ti ($E^0_{Cu+/Cu}$=0.34 V vs. SHE), applying a potential of ~0.1 V vs. SHE could dissolve the Ni section first, leaving the Ti and Cu sections intact. After any desired processing, the Cu supports/sections could be removed by applying a potential >0.34 V (to dissolve the Cu) but less than 0.7 V (to keep the Ti intact). Furthermore, because the body of the component, the support structures, and the sacrificial interface region are all formed of metal or ceramic materials, the 3D printed piece can be subjected to heat or other processing treatments that would otherwise damage other types of materials (e.g., polymers) without damaging the sacrificial interface region of the 3D printed piece.

Both chemical and electrochemical dissolution systems can be applied to provide flexibility in terms of processing and sequencing. For example, a chemical dissolution path could be used first followed by an electrochemical dissolution path (or some combination thereof).

In another example, it is specifically demonstrated that a stainless steel component with free standing arch structures with overhangs of 90-degrees can be fabricated using carbon steel as the sacrificial support structure that dissolves in a solution of nitric acid. Sacrificial anodes are often used to protect important parts from galvanic corrosion whenever two different metals are in contact with an electrolyte or if the same material is exposed to different electrolytic environments (e.g. above and below the water line of a ship's hull). A sacrificial anode is a material with a more negative reduction potential than the part material that will be preferentially oxidized over the part material. For example, a zinc anode (standard reduction potential, $E_o^{Zn}$=−0.76 V) is often used to protect stainless steel boat hulls since the standard reduction potential of Zn is lower than the base iron ($E_o^{Fe}$=−0.44 V) and the added chromium forms a protective passivation layer of chromium oxide with an even more positive standard reduction potential ($E_o^{Cr2O3}$=1.3 V). As long as the zinc available and is in electrical and electrolytic contact with the stainless steel hull, the zinc will preferentially oxidized to $Zn_{aq}^{2+}$ instead of the stainless steel hull.

In some implementations, selecting a proper sacrificial anode depends on the part material, the electrolyte solution, and the geometry of the part. For the purposes of this example, additional constraints are added for our 3D printed sacrificial anode. Specifically, for this example, the sacrificial anode was selected to be metallurgically compatible with the part material with similar crystal structures, similar thermal conductivities, similar coefficient of thermal expansion, and should avoid forming unwanted intermetallics, otherwise the interface between the sacrificial anode and the part will be too weak to handle the stresses caused by the extreme thermal cycling that occurs in DED of metals. Additionally, a corrosion electrolyte must be identified that will dissolve the sacrificial anode with a reasonably high selectivity (>100:1 preferred) compared to the part material. With this in mind, we selected stainless steel as our component material, carbon steel as a sacrificial anode support material, and 35 wt. % nitric acid as the corrosive electrolyte. Stainless steel has excellent resistance to nitric acid while carbon steel is rapidly chemically dissolved nitric acid even without an external bias. [ ] Potentiodynamic polarization curves for the DED printed stainless steel, carbon steel, and mixed stainless/carbon steel part are collected to select an driving potential where stainless steel can be biased at reduction potential while the carbon steel will be at an oxidizing potential. A free standing stainless steel arch was fabricated by printing stainless steel arch with a carbon steel support across the middle and then etching away the carbon steel in nitric acid with bias of 0.7 V relative to a saturated silver/silver chloride electrode.

An Optomec Laser Engineered Net Shaping (LENs) MR-7, directed-energy-deposition system was used for metal deposition. The system was equipped with a 500-watt Ytterbium-doped fiber laser (IPG YLR-500-SM) which was focused to a second-moment spot diameter of 0.62 mm at a distance of 20.7 mm above the substrate. Beam size measurements were made using a PRIMES GmbH FocusMonitor. The laser spot size was 1.2 mm at the working distance, which corresponded to a space of 9.3 mm between the substrate and four, radially symmetrically powder-delivery nozzles. Nozzles had an exit orifice diameter of 1.2 mm and were oriented at 18.3° with respect to the laser-beam propagation direction. Centered among the powder nozzles was a 6.4 mm diameter, center-purge nozzle, through which 30 L/min of Af flowed.

During deposition, the substrate was in the X-Y plane while the laser processing head remained stationary. After each layer deposition, the laser head was translated upward (in the +Z-direction) by a predefined layer increment.

To prepare the samples for electrochemical characterization and dissolution, the steel base was sectioned using a band saw so that the samples were approximately centered laterally on the steel base piece. A small hole was drilled and then tapped with a 4-40 (imperial) and a 16-gauge wire connected to the part using a screw and washer. For electrochemical characterization test, the sample was then potted in a nitric acid resistance epoxy (Epoxy Systems, Inc., 633 Grey) to cover the bottom, sides, wire, and the printed part. The top of the printed sample was exposed using a random orbital sander with increasing grits from 60 to 1200 until a near-mirror polish was observed. For the mixed stainless/carbon steel part, only the bottom and sides of the remaining steel based were coated with epoxy to protect the wire. Since the epoxy was ridged and was prone to cracking when wire was bent, a commercially available silicone was applied to the wire exterior of the wire for additional protection. No intrusion of the electrolyte was observed during or after electrochemical measurements and all electrical connections between the wire and the sample appeared pristine after the epoxy was removed. Samples were sonicated in acetone, then isopropyl alcohol, and dried using $N_2$ gas.

All chemicals were used as received. The electrolyte solution was made by mixing 70 wt. % nitric acid (Sigma Aldrich, ACS reagent, 70 wt. %, product number 438073) with dionized water (18.2 MΩ, Purelab Flex 3) at a volume ratio of 1:1—$HNO_3$:$H_2O$ to form a final volume of 200 mL. 8 grams of KCl was added to improve the electrical conductivity of the electrolyte. Immediately prior to electrochemical analysis/dissolution, the samples were sonicated in acetone, then isopropyl alcohol, and dried using $N_2$ gas.

A Pine Research Instruments WaveNow USB Potentiostat/Galvanostat was used to measure the Open-Circuit Potential (OPC), gather potentiodynamic polarization curves, and apply constant bias for electrochemical dissolution of the mixed stainless steel/carbon steel part. All measurements were made relative to a saturated silver/silver chloride electrode in a 4 M KCl (Alfa Aesar, 99%, product number: A11662) placed in a glass-fritted salt bridge (4 M KCl) located 0.5 mm from the working electrode (printed sample). The measured Potentials, E, were offset by +0.205 mV so that all reported values are relative to a Saturated Hydrogen Electrode (SHE). A 6 mm diameter graphite rod was used as the counter electrode. The electrodes were positioned in a line with the reference electrode between the working and counter electrodes. After collecting the data, the potential, E, was offset by +0.197 mV and reported relative to the Standard Hydrogen Electrode.

The OPC was measured for 5 minutes at 0 µA with a 10 second induction period and relaxation period at 0 µA at the beginning and end of the measurement. CV curves for polarization plots were gathered at in increasing magnitudes about the OPC until the measured current was greater than 50 mA. For the CV step size was set 5 mV/sec with a starting voltage 100 mV below the OPC.

For electrochemical dissolution of the sacrificial carbon steel, the working electrode was set to between 400 mV and 900 mV so that the measured current was between −100 mA for the initial half of the test and then, once the stainless steel appeared stable, the applied potential was increased positive to reduce the measured current to between −20 mA and −10 mA. Next $O_2$ gas was bubbled onto the carbon steel section of the working electrode to speed electrochemical dissolution of the sacrificial material.

Figure 10:
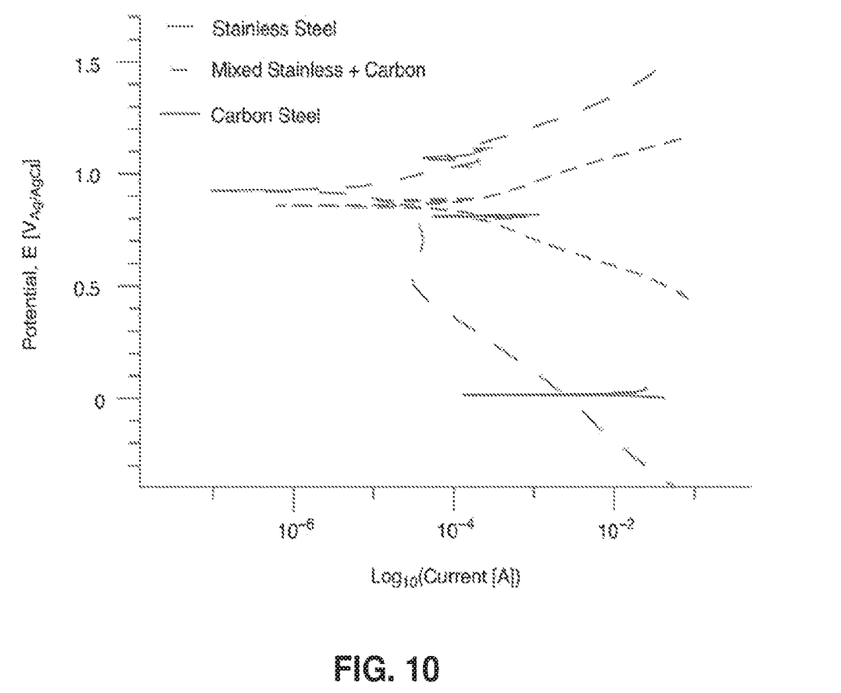
FIG. 10 is a graph of potentiodynamic polarization curves for stainless steel, mixed stainless/carbon steel, and carbon steel sample in 35 wt, % nitric acid.

OPC and potentiodynamic polarization curves of stainless steel and carbon steel printed samples with approximately 1 cm2 in exposed area were gathered in 35 wt. %. FIG. 10 shows potentiodynamic polarization curves of stainless steel, carbon steel, and the mixed steel part. The corrosion potentials, Ecorr, of these parts were measured at 1.113 VSHE, 1.004 VSHE, 0.197 VSHE. As expected, the stainless steel shows a larger Ecorr than both the mixed sample and the carbon steel sample. More importantly, these polarization curves show that carbon steel will be etched many orders of magnitude faster than the carbon steel over wide range of potentials.

Electrochemical etching the mixed stainless/carbon steel sample was conducted by setting a constant potential (typically between ~800 mVSHE to 900 mVSHE) to create a slight anodic current, on the order of −10 mA to −50 mA, with no $O_2$ bubbling. Since the Pinewave Now potentiostat is limited to 105 mA and was often driven to maximum current, the actual applied varied with the formation of passivating layers, changing surface area, and bubble entrapment within the stainless steel arch.

Figure 11:
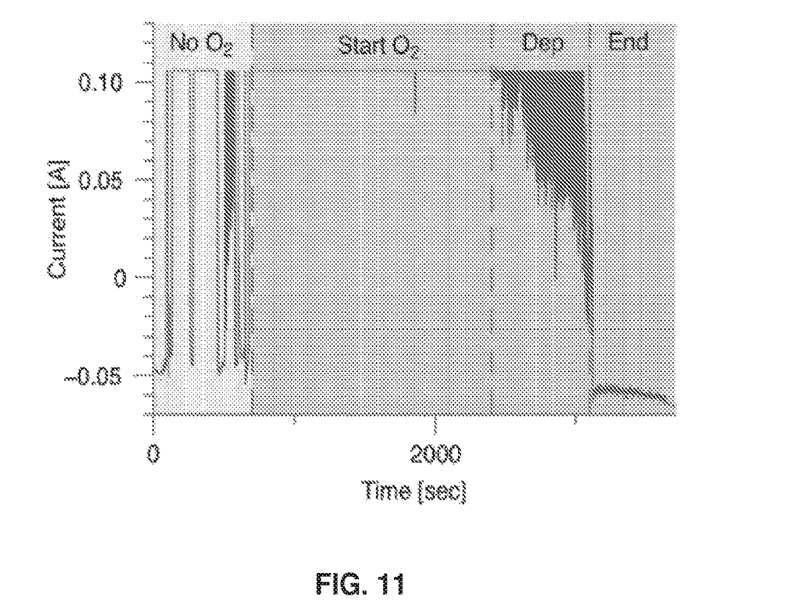
FIG. 11 is a graph of representative slices of current vs time with the potentiostat set to apply 900 $mV_{SHE}$ to a sample under four different environmental conditions: cyclic passivation film growth & dissolution (No $O_2$), applying $O_2$ enabling continuous cathodic dissolution (Start $O_2$), carbon steel depletion (Dep), and a small anodic current observed at an end stage.

FIG. 11 plots the measured current vs. time for representative time slices as experimental conditions were varied. Under potentials between ~800 mVSHE to 900 mVSHE, a cyclic shift from anodic to cathodic with a periodicity between 50 to 500 seconds is observed in FIG. 11, as a passivation layer on the carbon steel is formed and dissolved. Under these conditions, the stainless steel is well protected; however, the etch rate is too slow for practical applications and it took six hours to remove 2 mm of carbon steel. The etch rate was increased significantly by bubbling $O_2$ gas onto the carbon steel section of the part. The $O_2$ gas helps break down passivated carbon steel, a cathodic current develops, and the etch rate increases dramatically with rest of the carbon steel section removed in 6 hours. This constant cathodic current was not observed when bubbling $O_2$ onto the stainless steel section of the sample. The blue section and red sections of FIG. 11 show the end of the etching process as the carbon steel is depleted until no carbon steel is left for dissolution and an anodic current is observed while no bubble generation nor damage to the stainless steel part observed after an additional 10 minutes of exposure.

Figure 12:
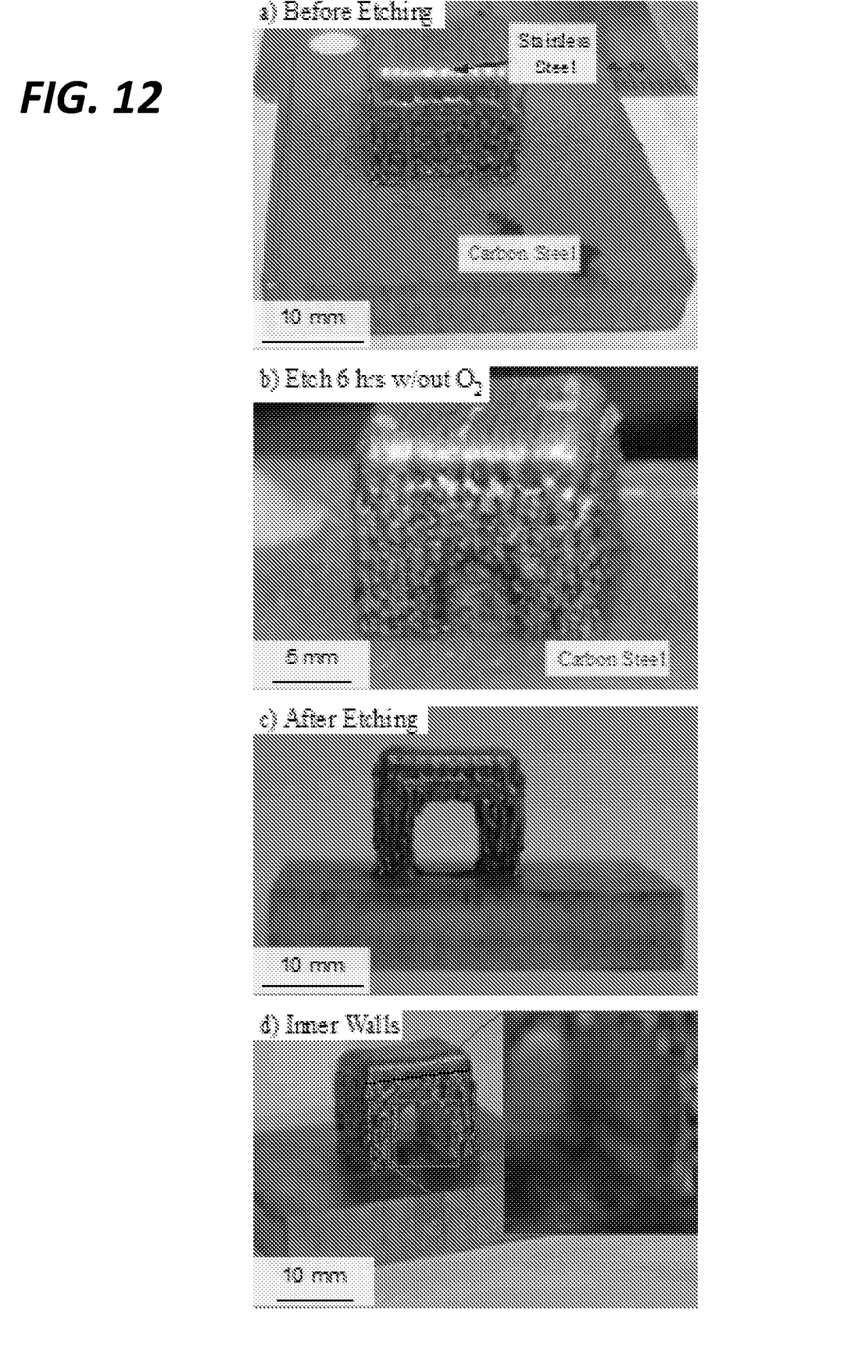
FIG. 12 is a series of perspective views of a sample before, during, and after etching using the techniques of FIG. 2.

FIG. 12 shows the sample before, during, and after etching. In part (a) of FIG. 12, a square is positioned to roughly illustrate outlines of the carbon steel section before etching. As shown in part (b) of FIG. 12, after six hours of etching without $O_2$ bubbling, 2 mm of carbon steel has been removed. Adding $O_2$ bubbles increased the etch rate and the rest of the sample was dissolved in six hours until a 90° stainless steel arch was left behind as illustrated in part (c) of FIG. 12.

The inset in part (d) of FIG. 12 shows the impact of using two materials with dramatically different chromium content.

Because stainless steel welds on carbon steel (or visa versa) show reduced corrosion resistance near the carbon/stainless steel interface, this local reduction in resistance is attributed to the formation of a depleted chromium layer within the stainless steel as chromium diffused into the chromium deficient carbon steel. The grooves etched into in the stainless steel component sidewalls and into the stainless base verify that this phenomenon occurs in mixed material DED printed components. It is important to account for this additional etching for, while no observable etching of the overall stainless steel component was observed, some tens of microns of stainless steel will be removed at the stainless/carbons steel interface Thus, the invention provides, among other things, systems and methods for fabricating metal or ceramic components using 3D printing techniques and incorporating a sacrificial interface region into the 3D printed component using different metal or ceramic materials. Various features and advantages of the invention are set forth in the following claims.

What is claimed is:

1. A method of fabricating a component, the method comprising:
    creating a 3D printed piece using a 3D printer, the 3D printed piece including a body of the component, a support structure, and a first sacrificial interface region coupling the body of the component to the support structure,
        the body of the component being formed of a first metal or ceramic material, and
        the first sacrificial interface region being formed at least partially of a second metal or ceramic material; and
    separating the body of the component from the support structure by applying a chemical or electrochemical dissolution process to the 3D printed piece, wherein the second metal or ceramic material is less resistant to the chemical or electrochemical dissolution process than the first metal or ceramic material,
    wherein the body of the component is formed solely of the first metal or ceramic material.

2. The method of claim 1, wherein creating the 3D printed piece includes creating the 3D printed piece including the support structure formed of the first metal or ceramic material.

3. The method of claim 1, wherein the second metal or ceramic material has a lower redox potential than the first metal or ceramic material, and
    wherein separating the body of the component from the support structure by applying the chemical or electrochemical dissolution process includes placing the 3D printed piece in an electrochemical etching bath with an anode set at a potential between the redox potential of the first metal or ceramic material and the redox potential of the second metal or ceramic material.

4. The method of claim 1, wherein creating the 3D printed piece including the body of the component being formed of the first metal or ceramic material and the first sacrificial interface region being formed of the second metal or ceramic material includes
    forming the body of the component of titanium, and
    forming the first sacrificial interface region of nickel.

5. The method of claim 1, wherein creating the 3D printed piece including the first sacrificial interface region being formed at least partially of the second metal or ceramic material includes forming the first sacrificial interface region formed entirely of the second metal or ceramic material.

6. The method of claim 1, wherein creating the 3D printed piece including the first sacrificial interface region being formed at least partially of the second metal or ceramic material includes forming the first sacrificial interface region including the second metal or ceramic material dispersively deposited within the first metal or ceramic material.

7. The method of claim 1, wherein creating the 3D printed piece including the first sacrificial interface region being formed at least partially of the second metal or ceramic material includes forming the first sacrificial interface region including the second metal or ceramic material gradiently deposited within the first metal or ceramic material.

8. The method of claim 1, wherein creating the 3D printed piece including the first sacrificial interface region being formed at least partially of the second metal or ceramic material includes forming the first sacrificial interface region structured with a cross-section formed partially of the first metal or ceramic material and partially of the second metal or ceramic material.

9. The method of claim 8, wherein separating the body of the component from the support structure by applying the chemical or electrochemical dissolution process includes dissolving the second metal or ceramic material from the first sacrificial interface region using a first chemical or electrochemical dissolution process and dissolving the first metal or ceramic material from the first sacrificial interface region using a second chemical or electrochemical dissolution process.

10. The method of claim 8, wherein separating the body of the component from the support structure by applying the chemical or electrochemical dissolution process includes dissolving the second metal or ceramic material from the first sacrificial interface region using the chemical or electrochemical dissolution process and applying a machining process to the first metal or ceramic material of the first sacrificial interface region to complete the separation of the body of the component from the support structure.

11. The method of claim 1, wherein creating the 3D printed piece includes creating the 3D printed piece to include a spacer region between the body of the component and the first sacrificial interface region, and further comprising applying a machining or polishing process to remove the spacer region from the body of the component after separating the body of the component from the support structure.

12. The method of claim 1, further comprising applying an additive to the 3D printed piece, wherein the additive protects the first metal or ceramic material from the chemical or electrochemical dissolution process.

13. The method of claim 1, further comprising applying an additive to the 3D printed piece, wherein the additive makes the second metal or ceramic material more susceptible to the chemical or electrochemical dissolution process.

14. The method of claim 1, wherein creating the 3D printed piece includes creating the 3D printed piece to include the support structure formed of the second metal or ceramic material.

15. The method of claim 1, wherein creating the 3D printed piece further includes creating the 3D printed piece that further includes a second sacrificial interface region coupling the body of the component to the support structure,
    wherein the second sacrificial interface region is formed of a third metal or ceramic material, and
    wherein the third metal or ceramic material is more resistant to the dissolution process than the second metal or ceramic material and less resistant to the dissolution process than the first metal or ceramic material so that the chemical or electrochemical dissolution process separates the body of the component from the support structure at the first sacrificial interface region before separating the body of the component from the support structure at the second sacrificial interface region.

16. The method of claim 1, wherein creating the 3D printed piece further includes providing an interface material between the body of the component and the first sacrificial interface region.

17. The method of claim 16, wherein the body of the component is formed of an aluminum material, wherein the first sacrificial interface region is formed of a silicon oxide material, and wherein the interface material between the body of the component and the first sacrificial interface region is formed of titanium.

18. The method of claim 1, wherein creating the 3D printed piece includes
    forming the body of the component using silicon carbide, and
    forming the first sacrificial interface regions using silicon oxide.

19. A method of fabricating a component, the method comprising:
    creating a 3D printed piece using a 3D printer, the 3D printed piece including a body of the component, a support structure, and a first sacrificial interface region coupling the body of the component to the support structure,
      the body of the component being formed of a first metal or ceramic material, and
      the first sacrificial interface region being formed at least partially of a second metal or ceramic material; and
    separating the body of the component from the support structure by applying a chemical or electrochemical dissolution process to the 3D printed piece, wherein the second metal or ceramic material is less resistant to the chemical or electrochemical dissolution process than the first metal or ceramic material,
    wherein creating the 3D printed piece includes
      forming the body of the component using silicon carbide, and
      forming the first sacrificial interface regions using silicon oxide.

* * * * *